United States Patent
Peltz

(10) Patent No.: US 6,510,180 B1
(45) Date of Patent: Jan. 21, 2003

(54) EMBEDDED SOFTWARE NEGOTIATION OF PCM COMPANDING FORMAT

(75) Inventor: Marshall L. Peltz, LaGrunge Park, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/218,316

(22) Filed: Dec. 22, 1998

(51) Int. Cl.[7] .............. H04B 1/66; H04B 14/04
(52) U.S. Cl. ........................ 375/241; 375/242
(58) Field of Search ................. 375/241, 219, 375/222, 224; 379/210, 88.2, 62.1, 69, 211, 12, 229, 234

(56) References Cited

U.S. PATENT DOCUMENTS

| | | | |
|---|---|---|---|
| 5,029,162 A | * | 7/1991 | Epps ............................ 370/252 |
| 6,058,180 A | * | 5/2000 | Young .......................... 379/234 |
| 6,111,870 A | * | 8/2000 | Kurtz ........................... 370/344 |
| 6,212,228 B1 | * | 4/2001 | Vlajnic ......................... 375/222 |

\* cited by examiner

*Primary Examiner*—Chi Pham
*Assistant Examiner*—Khai Tran
(74) *Attorney, Agent, or Firm*—Welsh & Katz, Ltd.

(57) ABSTRACT

A method and apparatus are described for selecting a companding format of a series of pulse code modulated (PCM) data words encoded under either an A-law or $\mu$-law companding format. The method includes the steps of expanding the PCM words into an average waveform sample value using both the A-law and $\mu$-law companding formats and selecting the companding format providing the expanded average sample value with a smallest relative absolute value.

22 Claims, 1 Drawing Sheet

EMBEDDED SOFTWARE NEGOTIATION OF PCM COMPANDING FORMAT

FIELD OF THE INVENTION

The field of the invention relates to telecommunication systems and more particularly to the encoding of voice signals transmitted over telephone trunk lines.

BACKGROUND OF THE INVENTION

Long distance telephone calls in the U.S. are typically established over a trunking network of T1 lines. In Europe, the trunking network is made up of E1 lines.

Under either the T1 or E1 format, a trunk channel typically has a capacity of 64 kb/s. Where a subscriber needs a full 64 kb/s, the entire trunk channel may be allocated as a subscriber channel. Where a subscriber requires less than 64 kb/s (e.g., 8 kb/s for a voice channel), the trunk channel may be divided into a number of subscriber channels.

In use, a subscriber channel may be used for either voice or data. While data typically originates in a digital format, voice usually does not. Voice originates in most cases under an analog format from a subscriber's telephone and is converted into a digital format, either at a local switching office or at a gateway to the trunking network. When the voice signal under a digital format reaches a listener's telephone, it must be again converted back to an analog format.

The conversion from analog to digital is referred to as compression, while the conversion back to analog is referred to as expansion. The overall compression and expansion of the signal is referred to as companding.

To ensure proper system-wide operation, the overall companding process at each end of the telephone system must be compatible. In the U.S. and Japan, companding occurs under an A-law format. In Europe and most of the rest of the world companding occurs under a $\mu$-law format.

In international calls between the U.S. and Europe, companding may occur more than once between speaker and listener because of the differences in companding formats. Further, equipment manufactured in the U.S. and sold in Europe (or visa versa) must be able to recognize and adapt to a local companding format. Because of the importance of telecommunications, a need exists for a simplified method of recognizing a companding format, that is operable from a board level within a communications processing system.

SUMMARY

A method and apparatus are described for selecting a companding format of a series of pulse code modulated (PCM) data words encoded under either an A-law or $\mu$-law companding format. The method includes the steps of expanding the PCM word into an averaged waveform sample value using both the A-law and $\mu$-law companding formats and selecting the companding format providing the expanded average sample value with a smallest relative absolute value.

DETAILED DESCRIPTION OS A PREFERRED EMBODIMENT

Figure 1:
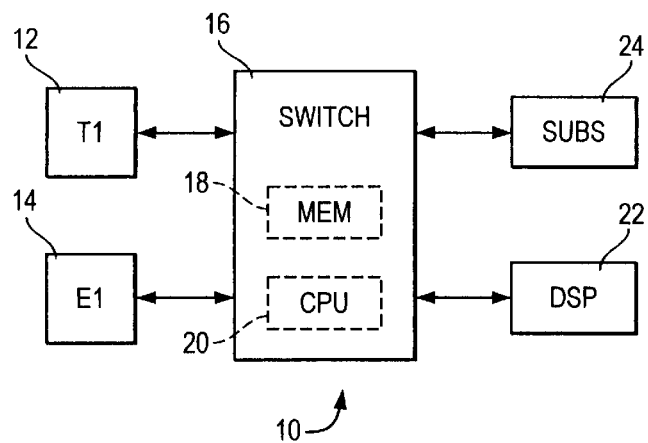
FIG. 1 is a block diagram of a companding system under an illustrated embodiment of the invention.

FIG. 1 is a block diagram of a telephone system 10, generally, in accordance with an illustrated embodiment of the invention. As shown, a switch 16 may exchange voice and control information with other switches (not shown) through one or more T1 or E1 trunk lines 12, 14. Calls may be placed and received based upon the control information exchanged through the trunk lines 12, 14.

For instance, where the switch 16 is a local switching office, it may service a number of subscriber units 24 in addition to servicing connections with the one or more trunk lines 12, 14. Call requests may be received from subscribers 24 for access to other subscribers (not shown) through other switches (or vice versa).

For example, upon receiving a call request from a subscriber 24, a CPU 20 within the switch 16 may determine a call route necessary to connect the subscriber 24 with a call target. To determine the call route, the CPU 20 may compare a set of dialed digits received from the subscriber 24 with a call routing table stored within a memory 18 of the switch 16. Once a route is determined, the switch 16 may seize a connection with an outgoing trunk line 12, 14 and transfer the set of dialed digits over the connection to a switch controller at a far end of the trunk line.

After a time period, the CPU 20 may receive an acknowledgement and finally a connect message indicating a connection with a called party. The CPU 20 may then instruct the switch 16 to form a connection between the subscriber 24 and seized trunk. The CPU 20 may also assign a digital signal processor (DSP) 22 to the conversation to compand a signal between the seized trunk and subscriber 24.

Figure 2:
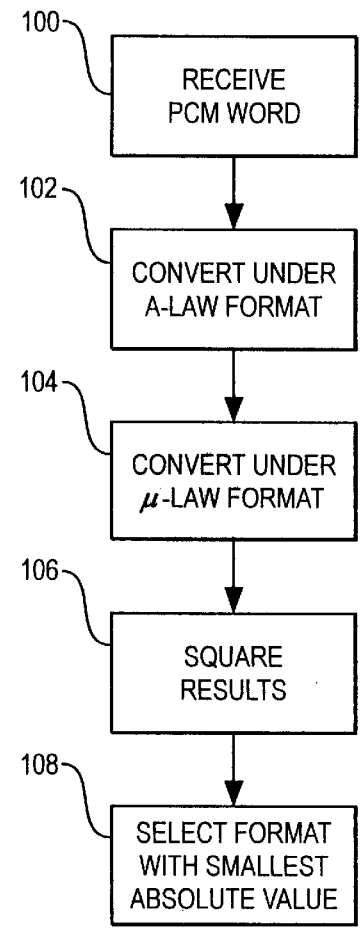
FIG. 2 is a flow chart of method steps that may be used by the system of FIG. 1.

FIG. 2 is a flow chart that shows a process that may be used for determining a companding format. Reference shall be made to FIG. 2 as appropriate to an understanding of the invention.

Under the illustrated embodiment, the DSP 22 monitors the trunk connection to determine a companding format found on the connection. Once the DSP 22 has determined the companding format, the DSP 22 functions to transceive voice information between the trunk connection and subscriber 24 based upon the determined format.

To briefly summarize, the DSP 22 monitors the connection for PCM data. Upon receiving PCM data, the DSP 22 expands the PCM data into waveform samples under both A-law and $\mu$-law. The waveform samples may then be squared and averaged to provide an average sample value (i.e., power value) under each format. It has been found that the compression format actually used produces the smallest average numeric value of the two possible formats.

In a first mode of operation, the DSP 22 may recover 100 a number (e.g., 64) of successive PCM words from an inbound connection for a time period first following setup of the connection. A telephone connection is typically quieted for the first 16 milliseconds (ms) first following completion of the connection and provides a opportunity for format analysis without the contribution of extraneous noise. While this approach has been found to perform well, the process has been found to also work well at any time after the period of quieting ends.

Following collection of PCM data, the PCM data is expanded. For example, the 64 samples may first be expanded 102 into 64 waveform sample values using the A-law expansion algorithm. Each of the A-law waveform sample values may then be squared 106. Squaring may be performed to eliminate sign as a processing consideration. Squaring also expands the waveform sample value into a power value. The squared A-law values may then be summed and the sum divided by 64 to obtain an average waveform power value of the A-law expansion.

Next, the 64 PCM samples are expanded 104 into 64 waveform samples using the $\mu$-law expansion algorithm. Again the 64 waveform samples are squared 106 and summed. The sum is again divided by 64 to obtain an average power value of the $\mu$-law conversion.

Selection 108 of the proper format based upon the smallest average result may be accomplished under any of a number of formats. For instance, the A-law result may be subtracted from the $\mu$-law result and a sign of the difference used as a selection criteria. If the value of the result is positive, then A-law is the proper companding format. If the value of the result is negative, then $\mu$-law is the proper companding format.

Figure 3:
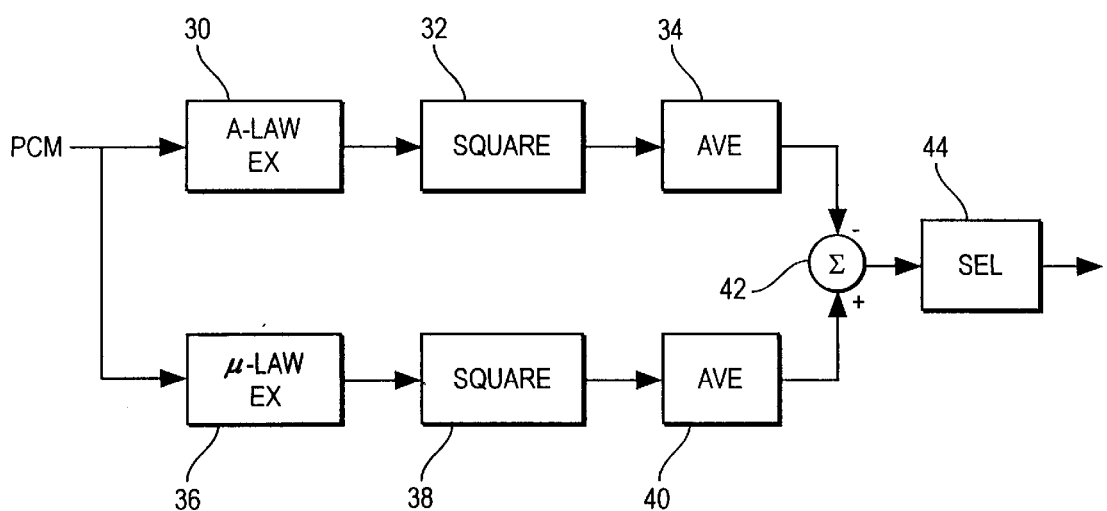
FIG. 3 is a block diagram of apparatus for selecting a companding format that may be used by the system of FIG. 1.

Under a second mode of operation (FIG. 3), PCM data bytes may be processed as they is received during the companding analysis period. As each PCM word is received, it is routed to an A-law expander 30 and a $\mu$-law expander 36 where it is expanded into a waveform sample value. Each expanded waveform sample value may then be squared into a power value within a pair of arithmetic units 32, 38. Within a pair of averagers 34, 40, the squared values are averaged over a sample period (e.g., 64 samples). The sign of the A-law averaged value may be inverted and the averaged values summed. The sign may be examined to determine the companding format. As above, where the sign is positive, an A-law format is selected. Where it is negative, a $\mu$-law format is selected.

Once a companding format is selected, a voice signal may be exchanged between caller and called party. A waveform of an analog voice signal from the subscriber 24 may be sampled and compressed into PCM data using the selected format and transmitted over the seized outbound trunk. Similarly PCM data received from the seized trunk may be expanded into waveform sample values using the selected format.

While, in some cases the analysis of PCM data for a proper format may be performed only once on startup of the system 10, there may be cases where analysis may be necessary at the beginning of each call. For instance, in the case of FIG. 1 where a switching office is connected to both T1 and E1 lines, it may be necessary to analyze each call to determine a proper companding format.

Alternatively, an analysis of the companding format may be performed periodically during a conversation. The periodic analysis of the companding format may be useful where a call connection is re-routed during use through other trunks and other switching equipment.

A specific embodiment of a method and apparatus for selecting a companding format according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method for selecting a companding format of a stream of pulse code modulated (PCM) data words encoded under either an A-law or $\mu$-law companding format, such method comprising the steps of:

expanding the PCM words into an averaged sample value using both the A-law and $\mu$-law companding formats; and selecting the companding format providing the expanded averaged sample value with a smallest relative absolute value.

2. The method for selecting a companding format as in claim 1 wherein the step of expanding the PCM words into a averaged sample value using both the A-law and $\mu$-law companding formats further comprises expanding the PCM words into a first set of waveform sample values using the A-law companding format and a second set of waveform sample values using the $\mu$-law companding format.

3. The method for selecting a companding format as in claim 2 further comprising squaring the values of the expanded first and second sets of sample values.

4. The method for selecting a companding format as in claim 3 wherein the step of squaring the expanded first and second sets of sample values further comprises averaging the squared first set of sample values and the second squared set of sample values over a time period to provide a averaged first sample value and a averaged second sample value, respectively.

5. The method for selecting a companding format as in claim 4 further comprising subtracting the averaged first sample value from the averaged second sample value to provide a difference value.

6. The method for selecting a companding format as in claim 5 further comprising determining the companding format to be A-law when the difference value is positive.

7. The method for selecting a companding format as in claim 5 further comprising determining the companding format to be $\mu$-law when the difference value is negative.

8. Apparatus for selecting a companding format of a stream of pulse code modulated (PCM) data words encoded under either an A-law or $\mu$-law companding format, such apparatus comprising:

means for expanding the PCM words into an average sample value using both the A-law and $\mu$-law companding formats; and means for selecting the companding format providing the expanded average sample value with a smallest relative absolute value.

9. The apparatus for selecting a companding format as in claim 8 wherein the means for expanding the PCM word into the average sample value using both the A-law and $\mu$-law companding formats further comprises means for expanding the PCM words into a first set of waveform sample values using the A-law companding format and means for expanding the PCM words into a second set of waveform sample values using the $\mu$-law companding format.

10. The apparatus for selecting a companding format as in claim 9 further comprising means for squaring the expanded sets of first and second sample values.

11. The apparatus for selecting a companding format as in claim 10 wherein the means for squaring the expanded first and second sets of sample values further comprises means for averaging the squared first and second sample values over a time period to provide a first and second averaged sample value.

12. The apparatus for selecting a companding format as in claim 11 further comprising means for subtracting the first sample averaged value from the second averaged sample value to provide a difference value.

13. The apparatus for selecting a companding format as in claim 12 further comprising means for determining the companding format to be A-law when the difference value is positive.

14. The method for selecting a companding format as in claim 12 further comprising determining the companding format to be μ-law when the difference value is negative.

15. Apparatus for selecting a companding format of a series of pulse code modulated (PCM) data words encoded under either an A-law or μ-law companding format, such apparatus comprising:

an expander adapted to expand the PCM words into an average sample value using both the A-law and μ-law companding formats; and a comparator processor adapted to select the companding format providing the expanded average sample value with a smallest relative absolute value.

16. The apparatus for selecting a companding format as in claim 15 wherein the expander for expanding the PCM word into the sample value using both the A-law and μ-law companding formats further comprises a first expander adapted to expand the PCM words into a first set of waveform sample values using the A-law companding format and a second expander adapted to expand the PCM words into a second set of waveform sample values using the μ-law companding format.

17. The apparatus for selecting a companding format as in claim 16 further comprising a squaring processor adapted to square the expanded first and second sets of sample values.

18. The apparatus for selecting a companding format as in claim 17 wherein the squaring processor further comprises an averaging processor adapted to average the first and second sets of squared sample values over a time period to provide a first averaged sample value and a second averaged sample value, respectively.

19. The apparatus for selecting a companding format as in claim 18 further comprising a sample comparator adapted to subtract the first averaged sample value from the second averaged sample value to provide a difference value.

20. The apparatus for selecting a companding format as in claim 19 further comprising a sign processor adapted to determine the companding format to be A-law when the difference value is positive.

21. The method for selecting a companding format as in claim 19 further comprising a second sign processor adapted to determine the companding format to be μ-law when the difference value is negative.

22. A method for selecting a companding format of a received series of pulse code modulated (PCM) data words received from a telephone network and encoded under either an A-law or μ-law companding format, such method comprising the steps of:

expanding the received PCM words into a first set of waveform sample values using an A-law companding format;

squaring the first set of waveform sample value expanded under the A-law companding format;

expanding the received PCM words into a second set of waveform sample values using an μ-law companding format;

squaring the second set of waveform sample values expanded under the μ-law companding format; and selecting one of the A-law and μ-law companding formats depending upon which set of squared waveform sample values has a smaller relative average value.

* * * * *